E. G. TAYLOR.
AIR BRAKE SYSTEM.
APPLICATION FILED JAN. 13, 1917.

1,295,235.

Patented Feb. 25, 1919.
4 SHEETS—SHEET 2.

WITNESSES

INVENTOR
Earl G. Taylor

E. G. TAYLOR.
AIR BRAKE SYSTEM.
APPLICATION FILED JAN. 13, 1917.

1,295,235.

Patented Feb. 25, 1919.
4 SHEETS—SHEET 3.

RUNNING

FIG. 10

SERVICE

WITNESSES

INVENTOR
Earl G. Taylor.
By Fred N. Winter
Attorney

E. G. TAYLOR.
AIR BRAKE SYSTEM.
APPLICATION FILED JAN. 13, 1917.

1,295,235.

Patented Feb. 25, 1919.
4 SHEETS—SHEET 4.

SERVICE LAP

INDEPENDENT ENGINE RELEASE

EMERGENCY

STRAIGHT AIR APPLICATION

STRAIGHT AIR LAP

FULL RELEASE

WITNESSES

INVENTOR
Earl G. Taylor
By Fred'k W. Winter
Attorney

UNITED STATES PATENT OFFICE.

EARL G. TAYLOR, OF BELLEVUE, PENNSYLVANIA.

AIR-BRAKE SYSTEM.

1,295,235.

Specification of Letters Patent.

Patented Feb. 25, 1919.

Application filed January 13, 1917. Serial No. 142,148.

*To all whom it may concern:*

Be it known that I, EARL G. TAYLOR, a resident of Bellevue, in the county of Allegheny and State of Pennsylvania, have invented a new and useful Improvement in Air-Brake Systems, of which the following is a specification.

The invention relates to air brake systems in which the engine and tender brakes are controlled independently of the car brakes, and the object is to provide an improved system of this kind in which the independent control above named is secured automatically by the manipulation of a single operating handle.

In the accompanying drawings which illustrate one embodiment of the invention.

Figure 1:
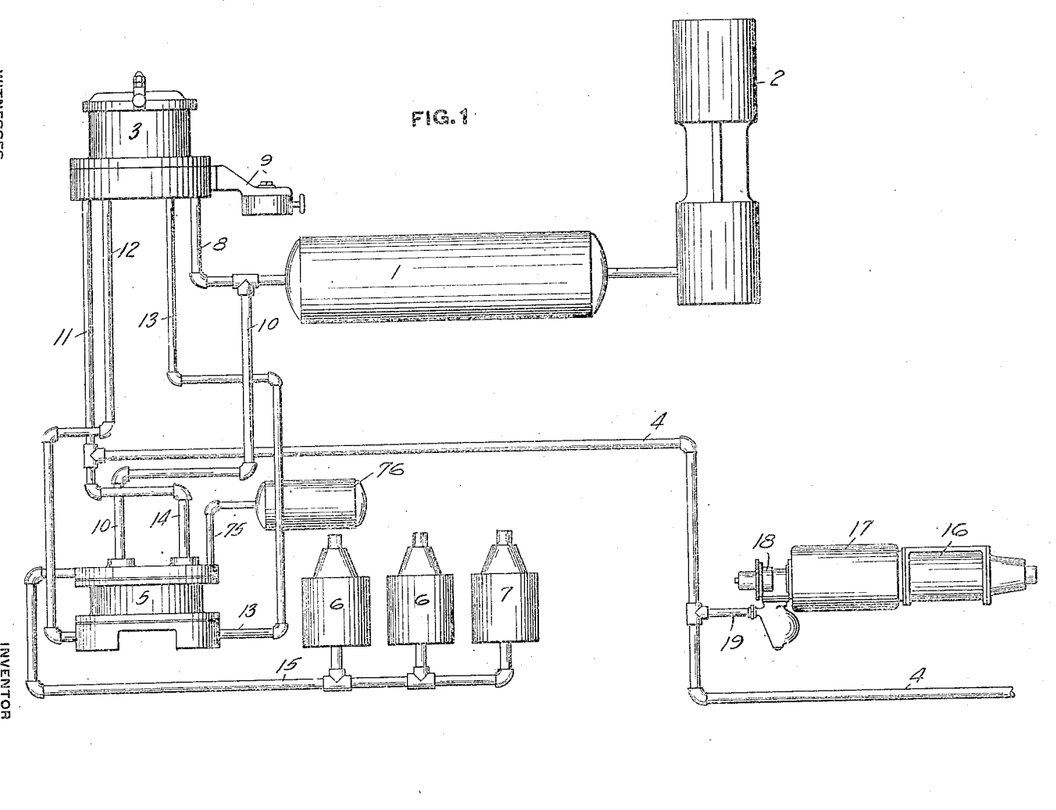
Figure 1 is a diagrammatic view of the system.

The system illustrated includes a main reservoir 1, supplied with compressed air by pump 2; an engineer's control valve 3; a train pipe 4 having connected thereto, through branch pipe 19, the usual car brake equipment comprising a brake cylinder 16, auxiliary reservoir 17, and triple valve 18; an automatic control valve 5 connected through pipe 15 to the engine and tender brake cylinders 6, 6 and 7; and piping connecting these parts, to-wit, a pipe 8 connecting the main reservoir to the engineer's brake valve, through a feed valve 9 which may be of any suitable type; a pipe 10 connecting the main reservoir to the automatic control valve 5; a pipe 11 connecting the engineer's brake valve 3 with the train pipe 4 and having a branch 14 connecting to the automatic control valve 5; a pipe 12 connecting the engineer's brake valve to the automatic control valve 5 for applying the engine brakes directly; and a pipe 13 also connecting the engineer's brake valve with the automatic control valve for holding the engine brake supplied when the train brakes are released.

Figure 2:
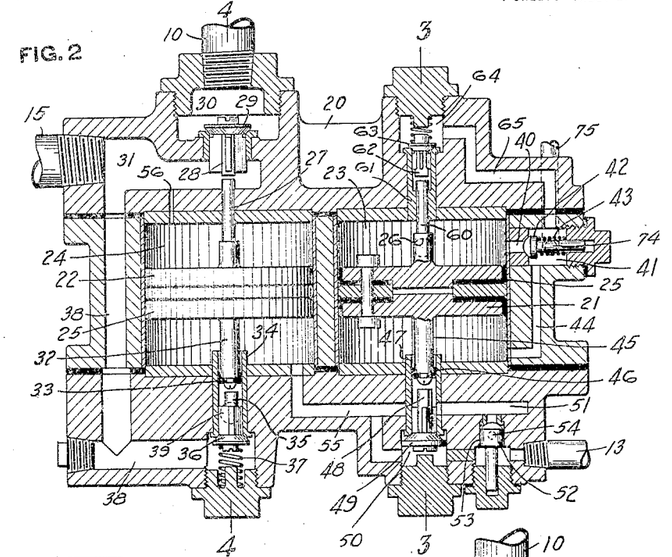
Fig. 2 is a longitudinal section through the automatic control valve.
Figure 3:
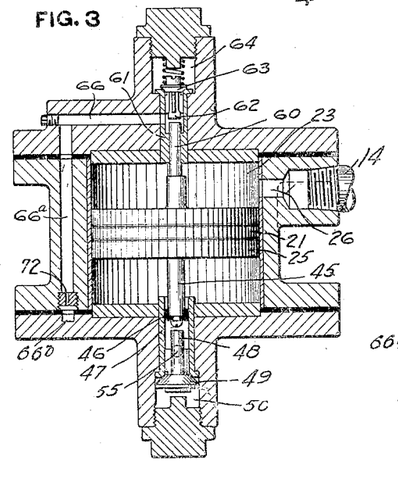
Figs. 3 and 4 are transverse sections through said valve taken respectively on the lines 3—3 and 4—4, Fig. 2.
Figure 4:
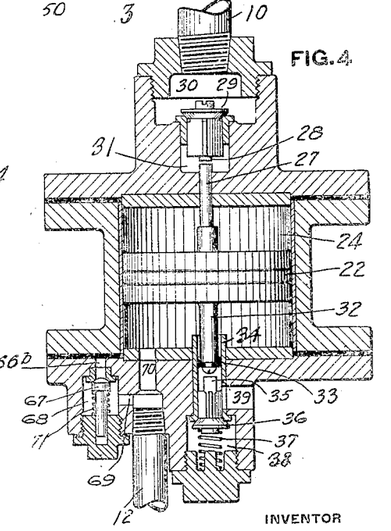

The automatic control valve 5, shown in Figs. 2, 3 and 4, is so arranged that by proper manipulation of the engineer's brake valve the engine brakes and car brakes can be applied and released independently, or can be applied simultaneously and either the car brakes or the engine brakes held while the other is released. This valve is provided with a housing 20 in which are located two movable abutments 21 and 22 operating in chambers 23 and 24. Each abutment is provided with suitable packing 25, as shown.

The abutment 21 is operated by train pipe pressure which is admitted to the upper portion of the chamber 23 through the opening 26 to which the pipe 14 is connected. This abutment is consequently responsive to variations in train pipe pressure and moves in response to variations made for the purpose of operating the car brakes.

The second abutment 22 which controls the engine brake cylinders directly is controlled in part by the movement of the first abutment, that is, whenever it is desired to apply or release the car and the engine brakes simultaneously, air is released or admitted to the control valve 5 so that the movement of the abutment 21 causes the abutment 22 to move to apply or release the engine brakes.

The abutment 22 carries a stem 27 which engages the stem 28 of a check valve 29 controlling communication between a chamber 30 to which the pipe 10 communicating with the main reservoir is connected, and a chamber 31 to which the pipe 15 communicating with the engine brake cylinder is connected. The check valve 29 is normally closed by gravity and main reservoir pressure, but whenever the abutment 22 is moved upwardly said valve is unseated and pressure is admitted from the main reservoir to the engine brake cylinders to apply the engine and tender brakes.

The abutment 22 also carries a stem 32 having a fluid-tight piston 33 operating within the sleeve 34 and arranged to engage the stem 35 of a check valve 36. This check valve is normally biased by a spring 37 to close communication between a passage 38 leading to the brake cylinder chamber 31 and an exhaust port 39. When the abutment 22 is moved downwardly it unseats the check valve 36 and opens communication between the passage 38 from the engine brake cylinders and atmosphere.

It will therefore be seen that, when the abutment 22 is moved upwardly, main reservoir pressure is admitted to the engine brake cylinders to apply the brakes and when said abutment is moved downwardly past its central position the brake cylinders are vented to the atmosphere to release the brakes.

The second abutment 22 is controlled by the first abutment 21 as follows:—

A passage 40 leads from the upper end of the chamber 23 in which abutment 21 operates, to a chamber 41 in which is located a check valve 42 normally maintained closed by a spring 43. The chamber 41 communicates with the lower end of the main chamber 23 by means of a passage 44 in the side of the valve housing. When train pipe pressure is admitted above the abutment 21 it moves said abutment downwardly and at the same time passes around check valve 42 and through passage 44 to the lower side of the abutment. The check valve is so regulated that the abutment 21 is readily moved whenever the train pipe pressure is increased above the same but shortly after said movement the pressures equalize and the abutment tends to move to central position, due to the difference in pressure of air above and below the same.

The abutment 21 carries a downwardly projecting stem 45 having a piston 46 operating in a sleeve 47 and arranged to engage the stem 48 of check valve 49. This check valve fits closely within a chamber 50 so that pressure on the under side thereof tends to maintain it closed and controls communication between said chamber and a passage 51 leading to a check valve 52 which fits closely within a chamber 53 and controls an exhaust port 54. The chamber 50 also communicates with a passage 55 leading to the lower end of the chamber 24 in which the abutment 22 operates. When the abutment 21 is moved downwardly it unseats the check valve 49 and permits fluid pressure from the under side of abutment 22 to be exhausted through passage 55, chamber 50, passage 51 and past check valve 52 to exhaust port 54.

The abutment 22 is accordingly moved downwardly by the pressure above it which is admitted through a feed groove 56. The downward movement of abutment 22 causes check valve 36 to be moved off its seat to vent the engine brake cylinders to atmosphere.

Train pipe pressure is normally equalized on opposite sides of the abutment 21, and when it is desired to release the car brakes, the train pipe pressure is increased and the abutment 21 is moved downwardly, thus venting the pressure from under abutment 22 and permitting the latter to be moved downwardly to exhaust the engine brake cylinders to the atmosphere. Under these conditions the car brakes and the engine brakes are released simultaneously. When it is desired to apply the car brakes the train pipe pressure is reduced, as usual, and this also reduces the pressure above the abutment 21 so that said abutment is moved upwardly by the pressure underneath it.

The abutment 21 carries an upwardly projecting stem 60 fitting closely within a sleeve 61 and arranged to engage the stem 62 of a check valve 63. The check valve 63 controls communication between a chamber 64 which is connected by a passage 65 with the chamber 41 and a passage 66, 66$^a$, 66$^b$ which passes around the piston chamber 23 in the valve housing, as shown in Fig. 3, and past a check valve 67 to a chamber 68 communicating by a passage 69 with passage 70 communicating with the lower end of the chamber 24 in which the abutment 22 operates. The check valve 67 is normally held closed by a spring 71 and prevents back flow of pressure from the chamber 24 to the chamber 41. The passage 66 is also provided with a reducing feed groove 72 for preventing too rapid a flow of pressure to the under side of the abutment 22, thus securing a gradual application of the engine brakes.

Accordingly, whenever the abutment 21 moves upwardly it unseats the check valve 63 and permits pressure to flow from the chamber 41 through the passage 66, past check valve 67 to the under side of abutment 22 and thereby moves said abutment upwardly to unseat the check valve 29 and permit main reservoir pressure to flow to the engine brake cylinders to apply the engine brakes.

Pressure is furnished to the chamber 41 through an opening 74 communicating with a pipe 75 and a pressure retaining tank 76. The tank 76 is furnished with pressure from the train pipe, as follows:—

Whenever the train pipe pressure is increased the pressure flowing into the upper end of chamber 23 passes through the opening 40 past the check valve 42 into chamber 41 and to the pressure retaining tank 76. As soon as the pressure in the chamber 23 above and below the abutment and in the pressure retaining tank 76 are equalized, the check valve 42 is closed by a spring 43 and the pressure is trapped in the retaining tank for use in operating the abutment 22, as above described.

It is sometimes desirable to hold the engine brakes applied while releasing the car brakes. For this purpose the engineer's valve is arranged so that when the control handle is placed in the proper position to increase the train pipe pressure, pressure is admitted through the pipe 13 to the chamber at the lower end of the automatic control valve and below the check valve 52. The pressure admitted through this pipe is main reservoir pressure which is greater than train pipe pressure and which therefore holds the check valve 52 against its seat, preventing the pressure from beneath the abutment 22 from being vented to atmosphere through port 54, even though the abutment 21 moves the check valve 49 off its seat in moving downwardly under increase in train pipe pressure to release the car brakes. Consequently, the abutment 22 will not move and the engine brakes will remain applied while the car brakes are being released when pressure is admitted to pipe 13.
It is also desirable to control the engine brakes independently of the car brakes, and for this purpose the pipe 12 from the engineer's control valve is connected to the automatic valve so that it communicates with the passage 70 and the lower side of abutment 22. The engineer's valve is arranged to admit or exhaust pressure through the pipe 12 and thereby move the abutment 22 up or down to apply or release the engine brakes. The admission of pressure to the pipe 12 is controlled by the engineer's valve in such a way that the car brakes are not operated when the engine brakes are being operated by straight air by the admission and release of air through the pipe 12.

Figure 5:
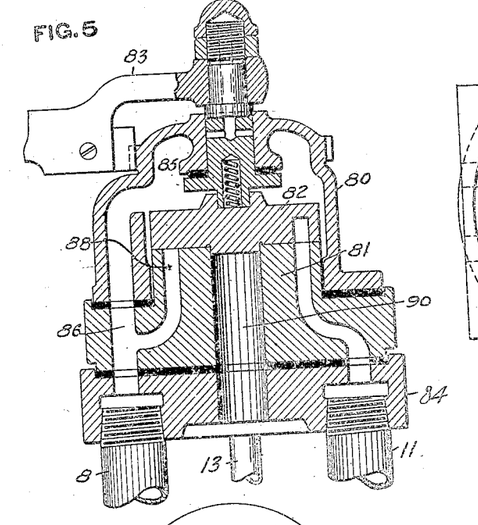
Fig. 5 is a vertical section through the engineer's valve.
Figure 6:
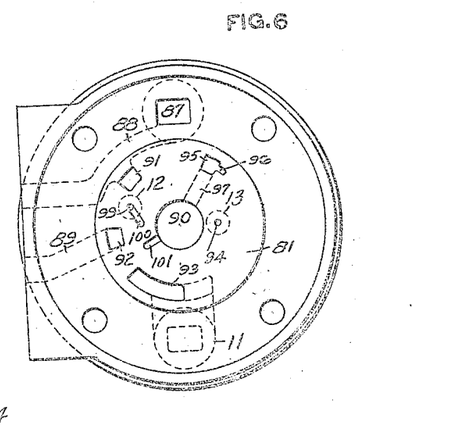
Fig. 6 is a plan view of the valve seat member of the engineer's valve and showing the connections of the piping thereto.

The engineer's brake valve comprises a suitable housing 80 and a base member 84, between which is interposed the stationary valve seat member 81, and a rotary member 82 controlled by handle 83 having the usual spring pressed pawl engaging notches in a segment on the housing. Main reservoir pipe 8 communicates with a chamber 85 in the valve housing above the rotary 82 through a passage 87 extending through the member 81 and which communicates through a branch passage 88 leading to a port in the valve seat and also arranged to be connected to a pipe or passage leading to the feed valve 9, not shown in Fig. 6, the return from said feed valve being through the passage 89 in the valve housing to a port in the valve seat. The pipe 11 communicating with the train pipe is connected as shown in Figs. 5 and 6 with a passage leading to a port in the valve seat. The pipes 12 and 13 are also connected so as to communicate with ports in said valve seat. The housing also has an exhaust passage 90 which registers with a corresponding passage in the valve seat.

Figure 7:
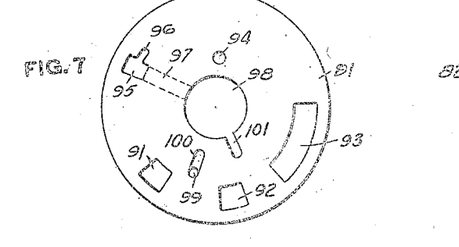
Fig. 7 is a plan view of the valve seat on an enlarged scale.

The valve seat 81 is provided with seven ports and passages, as follows:—

A through port 91 communicating with the passage 88 in the valve housing leading to the main reservoir; a through port 92 communicating with the passage 89 from the feed valve; a through port 93 communicating with the train pipe through the pipe 11; a through port 94 communicating with the pipe 13 leading to the automatic control valve 5 for the purpose of holding the engine brakes applied while the car brakes are released; a recess port 95 having a small extension 96 to the port and recess communicating by a cored-out passage 97 with an exhaust passage 98 which registers with the exhaust passage 90 in the main housing; a through port 99 communicating with the pipe 12 leading to the automatic control valve 5 for the purpose of independently controlling the engine brakes, said port also communicating with a recessed passage 100 in the top face of the valve seat; and a recess 101 communicating with the exhaust port 98.

Figure 8:
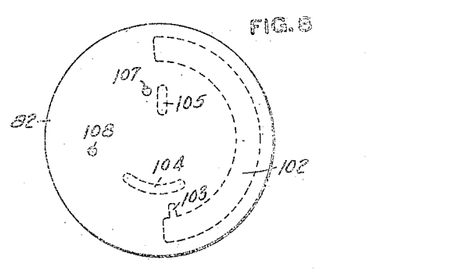
Fig. 8 is a plan view of the rotary member of said valve.

The rotary member 82 shown in Fig. 8 is provided on the face which coöperates with the valve seat with a recess 102 adapted in various positions of the rotary to establish different communications between the ports 91, 92, 93 and 95 of the valve seat. This recess has a small extension 103 which coöperates with the port 99 in the valve seat in certain positions of the rotary. The rotary has another recess 104 in its face which coöperates with the recesses 100 and 101 in the valve seat. The rotary is also provided with a recess 105 on its under face which registers in certain positions of the rotary with the port 94 in the valve seat and which communicates at all times with the exhaust passage 98 in the valve seat. The rotary also has a through port 107 which coöperates with the port 94 in the valve seat; and a through port 108 which coöperates with the recess 100 in the valve seat.

The rotary has eight positions relative to the valve seat, as follows:—

Figure 9:
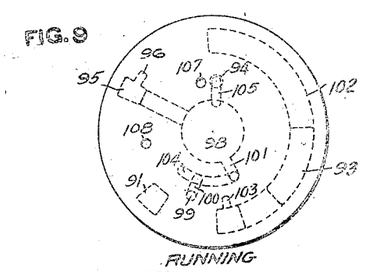
Figs. 9 to 16 inclusive are plan views of the valve seat with the rotary member on top thereof and showing in dotted lines the connections made in the different positions of the rotary, Fig. 9 showing the same in running position, Fig. 10 in service position, Fig. 11 in service lap position, Fig. 12 in independent engine release position, Fig. 13 in emergency application position, Fig. 14 in straight air engine brake application position, Fig. 15 in straight air lap position, and Fig. 16 in engine brake full release position.

1. *Running position.*

This position is shown in Fig. 9. The recess 102 establishes communication between the port 92 from the feed valve and the port 93 leading to the train pipe, and the train pipe is accordingly charged from the main reservoir through the feed valve. The recess 104 also connects recess 100 and its port 99 with the recess 101 leading to exhaust, thereby venting the pressure in pipe 12 to atmosphere and permitting the abutment 22 in the automatic control valve 5 to move downwardly and vent the engine brake cylinders to release them. In this position the engine brake cylinders are released by being vented to atmosphere and the train pipe is in communication with the main reservoir through the feed valve so that the car brakes are released. The recess 105 registers with the port 94 and thereby establishes communication between the port 94 and atmosphere through the exhaust passage 97. This insures that in running position there will be no pressure in pipe 13 and below the check valve 52 in the automatic control valve 5, which pressure might prevent the venting of the pressure from beneath the abutment 22 for releasing the engine brakes.

Figure 10:
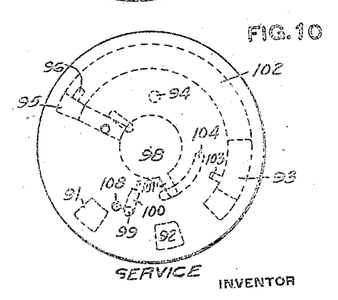

2. *Service position.*

In this position, which is shown in Fig. 10, the rotary has been moved farther in a counter-clockwise direction, breaking communicating between the port 92 from the feed valve and the port 93 to the train pipe and establishing communication between the port 93 and the narrow portion 96 of recess 95 which in turn communicates with the exhaust port 98 through the passage 97. The train pipe is accordingly vented to atmosphere through a relatively small passage. This reduces the pressure and gradually applies the car brakes, and at the same time reduces the pressure above abutment 21, permitting the pressure below said abutment to move it upwardly and open valve 63 which allows pressure to flow from the pressure retaining tank 76 below the abutment 22, thereby moving the abutment upwardly which movement permits the exhaust passage from the engine cylinders to be closed by check valve 36 and opens communication between the main reservoir and the engine brake cylinders to apply the engine brakes.

Figure 11:
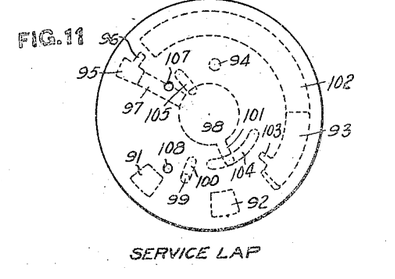

3. *Service lap position.*

In this position, shown in Fig. 11, the rotary has been moved back a short distance in a clockwise direction from the position shown in Fig. 10 and all the ports are blanked. The rotary is generally moved to this position after it has been moved to service position and the blanking of the ports leaves the brakes applied to a degree corresponding to the length of time the rotary has been left in service position.

Figure 12:
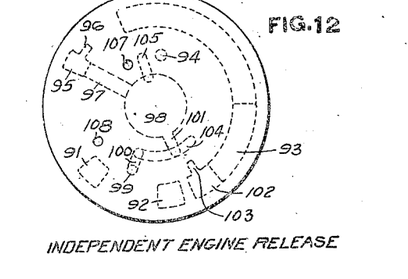

4. *Independent engine release position.*

The rotary is moved to this position, shown in Fig. 12, when it is desired to release the engine brakes independently of the car brakes. The rotary is moved clockwise a slight distance from the service lap position shown in Fig. 11. In this position all the ports leading to the train pipe are blanked and the car brakes remain applied but the recess 104 registers with the recesses 100 and 101 and thereby establishes communication between the port 99 and the atmosphere. This exhausts pressure through the pipe 12 from the lower side of the abutment 22 in the control valve 5, causing said abutment to be moved downwardly to open the check valve 35 which vents the engine brake cylinders to atmosphere. This releases the engine brakes but leaves the car brakes applied.

Figure 13:
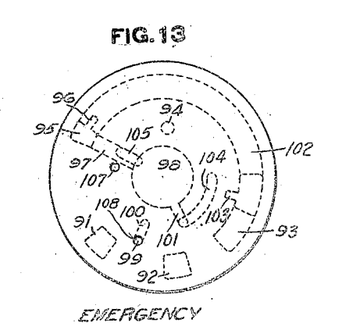

5. *Emergency position.*

This position, shown in Fig. 13, is obtained when it is desired to secure a sudden or emergency application of the brakes. The rotary is moved counter-clockwise beyond the service position shown in Fig. 10. In this position the recess 102 establishes full communication between the port 93 leading to the train pipe and the port 95 to the atmosphere so that the train pipe is vented rapidly to the atmosphere to cause the triple valves on the car brakes to go to emergency position and give an emergency application of the brakes. The through port 108 also registers in this position with the port 99 in the valve seat, thereby admitting main reservoir pressure from the top of the rotary through the port 99 to the pipe 12 and the lower side of the abutment 22 in the automatic control valve which moves said abutment upwardly rapidly and causes the main reservoir pressure to flow to the engine brake cylinders to apply the engine brakes.

Figure 14:
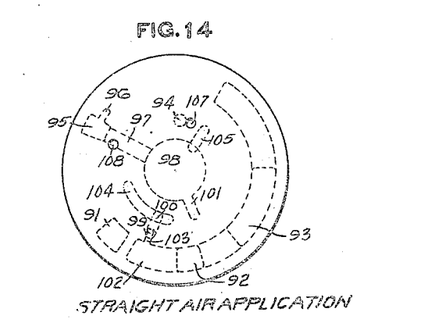

6. *Straight air application position.*

The rotary is moved to this position, shown in Fig. 14, when it is desired to apply the engine brakes independently of the car brakes. The rotary is moved from running position shown in Fig. 9. In this position the extension 103 of the recess 102 in the rotary registers with the port 99 in the valve seat and establishes communication between said port and the port 92 from the feed valve and main reservoir. This permits pressure to flow through the pipe 12 to the lower side of the abutment 22 in the control valve 5 which moves the abutment upwardly and unseats the check valve 29, permitting main reservoir pressure to flow to the engine brake cylinders to apply the engine brakes. The recess 102 also establishes communication between the port 92 from the feed valve and main reservoir and the port 93 leading to the train pipe, thereby maintaining pressure in the train pipe and keeping the car brakes released. The pressure below abutment 22 communicates through passage 55 with the lower face of check valve 49 and maintains said valve closed, thereby preventing the pressure below abutment 22 being vented to atmosphere because of maintenance of brake-pipe pressure.

Figure 15:
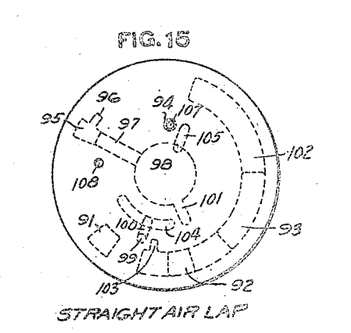

7. *Straight air lap position shown in Fig. 15.*

The rotary is moved to this position when it is desired to hold the engine brakes applied after the valve has been moved to straight air application position for a short period. The position is obtained by moving the rotary a short distance counter-clockwise from the position shown in Fig. 14. In this position the communication between port 99 and recess 103 is broken and the air below the abutment 22 in the control valve is trapped. The recess 102 maintains communication between the port 92 from the feed valve and the main reservoir and the port 13 leading to the train pipe so that pressure is maintained in the train pipe and the car brakes remain released. The port 107 also registers in this position with the port 94 and admits main reservoir pressure from the top of the rotary to the pipe 13 and behind the check valve 52, thereby preventing pressure being vented to atmosphere through port 54 from below the movable abutment 22. When a service application has been made and it is desired to release the car brakes and hold the engine brakes applied, the valve is moved to straight air lap position which admits pressure to the train pipe to release the car brakes, but holds the engine brakes applied as above explained.

Figure 16:
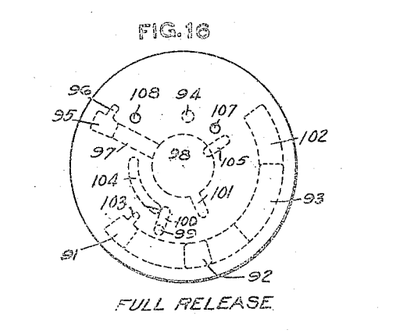

8. *Full release position shown in Fig. 16.*

The valve is moved to this position when it is desired to fully release the engine brakes with the car brakes maintained in release position. The position is obtained by moving the valve clockwise from the straight air application position shown in Fig. 14. In this position the recess 102 establishes direct communication from the port 91 from the main reservoir and the port 93 leading to the train pipe. Main reservoir pressure is therefore admitted to the train pipe without being reduced by the feed valve, as is the case in all other positions of the valve. This fully releases the car brakes, as will be readily understood and at the same time releases the engine brakes through the automatic control valve 5.

This apparatus gives the engineer complete and independent control of the engine and the train brakes by means of one engineer's brake valve. It is merely necessary to move the control lever of said valve to the required position for either applying the engine brakes separately or applying them simultaneously with the train brakes or for releasing the train brakes and maintaining the engine brakes applied. The control valve 5 operates automatically, is simple in construction and requires very little attention. The entire apparatus is relatively simple and may be inexpensively manufactured.

One of the important advantages of the control valve is the automatic pressure maintaining feature. After the abutment 22 is operated, either independently or with the train brakes to apply the engine brakes and the handle of the engineer's valve is placed in one of the lap positions, the abutment 22 will automatically maintain the engine brake cylinder pressure, if such pressure is reduced for any reason as by a leak in any of the connections or in the brake cylinder. Any reduction in brake cylinder pressure will reduce the pressure, the chamber above the abutment 22 through groove 56 and said abutment will be moved upwardly by the pressure under it, thereby again admitting pressure to the engine brake cylinders to raise the pressure to the required amount. This is an important advantage because it frequently happens that leaks occur which cause the brakes to be gradually released after they have been applied.

This apparatus is also particularly advantageous when used with two engines which are coupled together for double heading purposes. In such cases it is desirable to have all the brakes controlled by one engineer, preferably the engineer of the first engine. In the apparatus herein described, the engineer's brake valve on the second engine is placed in service lap position in which all the ports of the valve are blanked. With the engineer's valve on the second engine in this position, the automatic control valve on the second engine is nevertheless responsive to variations in train pipe pressure and consequently the engineer on the first engine has control of the brakes on the second engine in the same way that he has control of the car brakes. In other words, the automatic control valve on the second engine acts similarly to a triple valve.

If the engineer on the second engine should desire to release the engine brakes on his engine independently of the first engine or the train, he can do so by placing the handle of the engineer's brake valve in independent engine release position which will release his brakes but not affect the first engine or the train.

Also, if it is desired to have the engineer on the second engine assist in releasing the train and holding his engine brakes applied, this can be done by placing his engineer's brake valve in straight air lap position.

These advantages in the use of the apparatus for double heading will be readily appreciated since these functions can be secured without any auxiliary adjustment of the equipment and at the same time every requirement of braking service is made.

It is to be understood that the structures shown are for purposes of illustration and that other structures may be devised which come within the spirit and scope of the appended claims.

What I claim is:

1. The combination in an air braks system having a main reservoir, train pipe, engine and car brake cylinders, of an automatic control valve, and an engineer's valve operable by a single handle, said control valve having a movable abutment arranged to control the supply and exhaust of motive fluid to and from the engine brake cylinders, a second movable abutment responsive to variations in train pipe pressure arranged when moved by increases in train pipe pressure to exhaust motive fluid from one side of the first abutment and when moved by decreases in train pipe pressure to admit motive fluid to the said side of the first abutment, and means rendered operable by the admission of pressure thereto when the engineer's brake valve is moved to one position to increase the train pipe pressure for preventing the exhaust of pressure from said side of the first abutment by the movement of the second abutment under the increase in train pipe pressure.

2. The combination in an air brake system having a main reservoir, engineer's valve, train pipe, engine and car brake cylinders, of an automatic control valve having an abutment controlling the supply and exhaust of fluid pressure to and from the engine brake cylinders, a second abutment responsive to variations in train pipe pressure and arranged to control the supply and exhaust of fluid pressure to and from one side of the first abutment, whereby when the second abutment is moved in response to variations in train pipe pressure in the application and release of the car brakes, the second abutment is moved to simultaneously apply and release the engine brakes, said automatic control valve being provided with means for preventing the movement of the second abutment when the first abutment is moved under increases in train pipe pressure to release the car brakes, whereby the engine brakes may be held applied when the car brakes are released.

3. The combination in an air brake system having a main reservoir, engineer's valve, train pipe, engine and car brake cylinders, of an automatic control valve having an abutment controlling the supply and exhaust of fluid pressure to and from the engine brake cylinders, a second abutment responsive to variations in train pipe pressure and arranged to control the supply and exhaust of fluid pressure to and from one side of the first abutment, whereby when the second abutment is moved in response to variations in train pipe pressure in the application and release of the car brakes, the second abutment is moved to simultaneously apply and release the engine brakes, said automatic control valve being provided with means for preventing the movement of the second abutment when the first abutment is moved under increases in train pipe pressure to release the car brakes, whereby the engine brakes may be held applied when the car brakes are released, said control valve also having means arranged so that fluid pressure may be admitted to the first abutment while the train pipe pressure is maintained to maintain the car brakes released, whereby fluid pressure is admitted to the engine brake cylinders to independently apply the engine brakes.

4. The combination in an air brake system having the main reservoir, train pipe, engine and car brake cylinders, of an automatic control valve and an engineer's valve operable by a single handle, said control valve having a movable abutment arranged when moved by increases in train pipe pressure to exhaust motive fluid from one side of the first abutment and when moved by decreases in train pipe pressure to admit motive fluid to the said side of the first abutment, means rendered operable by the admission of pressure thereto when the engineer's brake valve is moved to one position to increase the train pipe pressure for preventing the exhaust of pressure from one side of the first abutment by the movement of the second abutment under the increase in train pipe pressure, and means arranged so that when the engineer's brake valve is moved to another position fluid pressure is admitted directly to one side of the first abutment to move the same to admit pressure to the engine brake cylinders while train pipe pressure remains constant.

5. The combination with an air brake system having a main reservoir, feed valve, train pipe, engine and car brake cylinders, of an automatic control valve having an abutment arranged to control the supply of feed controlled pressure to the engine brake cylinders and the exhaust from said cylinders, a second abutment responsive to variations in train pipe pressure and arranged to control the supply and exhaust of fluid pressure to and from the first abutment, said engineer's brake valve being arranged so that when in position to increase the train pipe pressure to release the car brakes, the second abutment is moved which causes the first abutment to be moved to exhaust pressure from the engine brake cylinders, and when moved to position to decrease the train pipe pressure to apply the car brakes, the second abutment is moved in an opposite direction to cause the first abutment to be moved in the opposite direction to admit feed control pressure to the engine brake cylinders, said engineer's valve being also arranged so that when moved to another position for increasing the train pipe pressure to release the car brakes, pressure is admitted to means in the automatic control valve for preventing the movement of the second abutment under the increase in train pipe pressure for moving the first abutment, whereby the engine brakes remain applied.

6. The combination with an air brake system having a main reservoir, feed valve, train pipe, engine and car brake cylinders, of an automatic control valve having an abutment arranged to control the supply of feed controlled pressure to the engine brake cylinders and the exhaust from said cylinders, a second abutment responsive to variations in train pipe pressure and arranged to control the supply and exhaust of fluid pressure to and from the first abutment, said engineer's brake valve being arranged so that when in one position to increase the train pipe pressure to release the car brakes, the second abutment is moved which causes the first abutment to be moved to exhaust pressure from the engine brake cylinders, and when moved to another position to decrease the train pipe pressure to apply the car brakes, the second abutment is moved in an opposite direction to cause the first abutment to be moved in the opposite direction to admit feed valve pressure to the engine brake cylinders, said engineer's valve being also arranged so that when moved to another position to increase the train pipe pressure to release the car brakes, pressure is admitted to means in the automatic control valve for preventing the movement of the second abutment under the increase in train pipe pressure for moving the first abutment, whereby the engine brakes remain applied, said engineer's valve being further arranged so that when moved in another position with the train pipe pressure exhausted, main reservoir pressure is admitted directly to one side of the first abutment to operate it to admit pressure to the engine brake cylinders while the car brakes remain released.

7. An automatic control valve for air brake systems having a movable abutment arranged to control the supply and exhaust of fluid pressure to a brake cylinder passage, a second abutment controlling the supply and exhaust of motive fluid to one side of the first abutment, said first abutment being arranged to automatically maintain the pressure in the brake cylinder passage constant when the valve mechanism is in position to maintain pressure in such passage.

8. An automatic control valve for air brake systems having two movable abutments, one of said abutments being arranged when moved in one direction to admit fluid pressure to a brake cylinder passage and when moved in the opposite direction to open a vent from said passage to atmosphere, the other of said abutments being responsive to train pipe pressure and being arranged when moved by increases in train pipe pressure to vent pressure from one side of the first abutment to cause said first abutment to be moved to vent the brake cylinder passage, said second abutment also being arranged so that when moved by decreases in train pipe pressure it admits pressure to one side of the first abutment to move said abutment to admit fluid pressure to the brake cylinder passage.

9. An automatic control valve for air brake systems having two movable abutments, one of said abutments being arranged when moved in one direction to admit fluid pressure to a brake cylinder passage and when moved in the opposite direction to open a vent from said passage to atmosphere, the other of said abutments being responsive to train pipe pressure and being arranged when moved by increases in train pipe pressure to vent pressure from one side of the first abutment to cause said first abutment to be moved to vent the brake cylinder passage, said second abutment also being arranged so that when moved by decreases in train pipe pressure it admits pressure to one side of the first abutment to move said abutment to admit fluid pressure to the brake cylinder passage, and means for preventing the second abutment from venting pressure from below the first abutment under predetermined conditions.

10. An automatic control valve for air brake systems having a movable abutment controlling the admission and exhaust of fluid pressure to a brake cylinder passage, and a second abutment responsive to train pipe pressure and arranged to control the admission and exhaust of fluid pressure to one side of the first abutment whereby when the train pipe pressure is increased the second abutment is moved to vent pressure from one side of the first abutment to cause it to be moved to vent the brake cylinder passage and when the second abutment is moved by decreases in train pipe pressure, pressure is admitted to one side of the first abutment to move it to admit pressure to the brake cylinder passage.

11. An automatic control valve for air brake systems having a movable abutment controlling the admission and exhaust of fluid pressure to a brake cylinder passage, a second movable abutment responsive to train pipe pressure and arranged to control the admission and exhaust of fluid pressure to and from one side of the first movable abutment, whereby when the second abutment is moved by increases in train pipe pressure, pressure is exhausted from one side of the first abutment so that it is moved to vent the brake cylinder passage, and when the second abutment is moved by decreases in train pipe pressure, pressure is admitted to the same side of the first abutment to move it to admit pressure to the brake cylinder passage, and means for preventing the movement of the second abutment under decreases in train pipe pressure for venting the pressure from one side of the first abutment.

12. An automatic control valve for air brake systems having a movable abutment controlling the supply and exhaust of motive fluid to and from a brake cylinder passage, a second movable abutment responsive to variations in train pipe pressure and arranged to control the supply and exhaust of motive fluid to and from one side of the first abutment, whereby when the second abutment is moved by increases in train pipe pressure, the first abutment is moved to exhaust pressure from the brake cylinder passage and when the second abutment is moved by decreases in train pipe pressure the first abutment is moved to admit pressure to the brake cylinder passage, and means for admitting pressure to one side of the first abutment independently of the second abutment to thereby cause said abutment to be moved to admit pressure to the brake cylinder passage.

13. An automatic control valve having a movable abutment controlling the supply and exhaust of fluid pressure to a brake cylinder passage, a second movable abutment responsive to variations in train pipe pressure and controlling the supply and exhaust of fluid pressure to and from one side of the first abutment so that when the second abutment is moved by increases in train pipe pressure, the first abutment is moved to exhaust pressure from the brake cylinder passage, and when the second abutment is moved by decreases in train pipe pressure, the first abutment is moved to admit pressure to the brake cylinder passage, means operable under predetermined conditions to prevent the first abutment being moved when the second is moved under increases in train pipe pressure, and means for admitting pressure to one side of the first abutment to move the same independently of the second abutment to cause pressure to be admitted to the brake cylinder passage while the first abutment and the train pipe pressure remains constant.

14. An automatic control valve for an air brake system having two movable abutments, a check valve normally closing a passage between a fluid pressure supply chamber and a passage to a brake cylinder, said first abutment being arranged when moved in one direction to open said check valve and admit pressure to the brake cylinder passage, a second check valve controlling a vent from the brake cylinder passage and arranged to be operated by said first abutment when it is moved in the opposite direction, a third check valve controlling a vent from one side of the first abutment to atmosphere and being arranged to be moved by the second abutment when it is moved in one direction to thereby vent pressure from one side of the second abutment and permit said abutment to vent pressure from the brake cylinder passage, and a fourth check valve controlling a passage from a fluid pressure supply to one side of the first abutment, said fourth check valve being arranged to be operated by the second abutment when it is moved in the opposite direction to thereby admit pressure to one side of the first abutment to move it to open the first check valve and admit pressure to the brake cylinder passage.

15. An automatic control valve having a movable abutment controlling the supply and exhaust of fluid pressure to and from a brake cylinder passage, a second movable abutment responsive to variations in train pipe pressure and arranged to control the supply and exhaust of motive fluid to and from one side of the first abutment so that when the second abutment is moved under increases in train pipe pressure, the first abutment is moved to vent pressure from the brake cylinder passage, and when the second abutment is moved under decreases in train pipe pressure, the first abutment is moved to admit pressure to the brake cylinder passage, the opposite side of the first abutment being in restricted communication with the brake cylinder passage, whereby when undesired reduction in pressure takes place in the brake cylinder passage, the first abutment is automatically moved to admit fluid pressure to the brake cylinder passage to maintain the pressure at the required amount.

16. The combination of an air brake system having the usual main reservoir, train pipe, engine and car brake cylinders, of an engineer's brake valve and an automatic control valve for controlling the fluid pressure to the engine brake cylinders, said control valve being responsive to train pipe pressure whereby when the engineer's brake valve is placed in a certain position the engine brakes may be controlled by variations in train pipe pressure from another point, said control valve and engineer's valve being also arranged so that the engine brakes may be released independently of the train pipe pressure.

17. The combination with an air brake system, of an automatic control valve responsive to variations in train pipe pressure for controlling the flow of fluid pressure to the engine brake cylinders, and an engineer's valve for controlling the flow of pressure to the automatic control valve and the train pipe, said engineer's valve being arranged so that in one position all ports are blanked and the automatic control valve is responsive to variations in train pipe pressure and also being arranged so that when moved to another position, the control valve may be actuated independently of the train pipe pressure.

In testimony whereof, I have hereunto set my hand.

EARL G. TAYLOR.

Witnesses:
G. H. LERESCHE,
R. W. EMERY.